United States Patent
Pan et al.

(10) Patent No.: US 8,234,949 B2
(45) Date of Patent: Aug. 7, 2012

(54) POWER TRANSMISSION MECHANISM AND ROBOT ARM USING THE SAME

(75) Inventors: Wei Lung Pan, Taichung County (TW); Chun Hung Huang, Hsinchu County (TW); Hsiang Nien Chung, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 309 days.

(21) Appl. No.: 12/700,330

(22) Filed: Feb. 4, 2010

(65) Prior Publication Data

US 2011/0126651 A1    Jun. 2, 2011

(30) Foreign Application Priority Data

Nov. 30, 2009   (TW) ................................ 98140909 A

(51) Int. Cl.
*B25J 17/00* (2006.01)
*B25J 17/02* (2006.01)
*B25J 18/00* (2006.01)
(52) U.S. Cl. ..................... 74/490.04; 74/490.01; 901/21
(58) Field of Classification Search ............... 74/490.01, 74/490.04, 490.05; 901/21, 28
See application file for complete search history.

(56) References Cited

U.S. PATENT DOCUMENTS

| | | | | |
|---|---|---|---|---|
| 5,046,375 A | * | 9/1991 | Salisbury et al. | 74/89.22 |
| 5,207,114 A | | 5/1993 | Salisbury, Jr. et al. | |
| 6,991,627 B2 | * | 1/2006 | Madhani et al. | 606/1 |
| 2005/0005725 A1 | * | 1/2005 | Chang et al. | 74/490.06 |
| 2008/0229862 A1 | * | 9/2008 | Nakamoto | 74/490.04 |

* cited by examiner

*Primary Examiner* — Justin Krause
(74) *Attorney, Agent, or Firm* — Morris Manning & Martin LLP; Tim Tingkang Xia, Esq.

(57) ABSTRACT

A power transmission mechanism and a robot arm using the same are described. The power transmission mechanism at least includes a first power source, a second power source, a plurality of steel ropes, a support arm component, a stopping component and a joint component. The stopping component is disposed in the support arm component and includes a first stopping unit and a second stopping unit that rotate coaxially. The first and second power sources and the joint component are disposed at two ends of the support arm component. The first and second power sources transmit power via the first stopping unit and the second stopping unit through the plurality of steel ropes to drive the joint component to perform a two-degree-of-freedom motion. The support arm component and the joint component can be applied in an upper arm and an elbow of a robot arm, thereby constituting a multi-degree-of-freedom robot arm.

4 Claims, 13 Drawing Sheets

POWER TRANSMISSION MECHANISM AND ROBOT ARM USING THE SAME

CROSS-REFERENCE TO RELATED APPLICATIONS

This non-provisional application claims priority under 35 U.S.C. §119(a) on Patent Application No(s). 098140909 filed in Taiwan, R.O.C. on Nov. 30, 2009, the entire contents of which are hereby incorporated by reference.

BACKGROUND OF THE INVENTION

1. Field of Invention

The present invention relates to a power transmission mechanism, and more particularly to a power transmission mechanism applied in a multi joint robot arm.

2. Related Art

The robot or robot arm has been widely applied in various different fields such as production and manufacturing, warehouse management, and intelligent nursing. The robot or robot arm is usually formed by a structure with a plurality of support arms connected together. The pivoting motion of each support arm is controlled by driving joints connecting the support arms.

During motions of a robot arm, a joint is rotated by using a rotating power provided by a motor. The power of the motor is output via a speed reducer to realize a relatively large torque. In a conventional robot arm, each motor is directly mounted on each joint. However, if each motor is directly mounted on each joint, each joint has a more complicated structure and bears an increased load, and as a result, the robot arm rotates under a large inertia. Furthermore, it is also quite difficult to configure lines of the motors, in order to prevent the lines of the motors from being wound together.

In order to solve the aforementioned problems, for example, U.S. Pat. No. 5,207,114 has disclosed "COMPACT CABLE TRANSMISSION WITH CABLE DIFFERENTIAL", in which a four-axially-driven robot arm is provided, and mainly uses steel ropes as a power transmission medium. In U.S. Pat. No. 5,207,114, the motor is disposed on the lower layer of the robot arm, and transmits power through the steel ropes, so as to solve the problems caused when the motor is directly mounted on each joint. However, in order to prevent too many steel ropes from winding together during power transmission, as disclosed in U.S. Pat. No. 5,207,114, the motor transmits power to a coupling member (marked as 24 in FIG. 8) via two steel ropes (marked as 19ra and 19rb in FIG. 8), such that the link arm (marked as 18 in FIG. 8) only has one degree-of-freedom, thereby motions of the robot arm are restricted.

Furthermore, the length of the support arm of the robot arm is just the working range of the robot arm, and the longer the support arm is, the wider the working range will be. However, if the support arm becomes longer, the steel ropes also become longer, i.e., the load of the steel ropes becomes heavier. Thus, it is necessary to adjust the tension of the steel ropes frequently, so as to reduce power transmission loss. Unfortunately, the service life of the steel ropes is shortened accordingly.

SUMMARY OF THE INVENTION

A joint-type robot arm stopped by steel ropes in the prior art is limited by the relation of steel ropes in spatial arrangement and thus has limited degree-of-freedom. Furthermore, the length of the support arm in the robot arm further influences the power transmission and service life of the steel ropes. In view of the above, the present invention is a power transmission mechanism and a robot arm using the same.

The present invention provides a power transmission mechanism, which at least comprises a first power source, a second power source, a plurality of steel ropes, a support arm component, a stopping component, and a joint component. The first and second power sources and the joint component are disposed at two ends of the support arm component. The stopping component is disposed in the support arm component and comprises a first stopping unit and a second stopping unit that rotate coaxially. The first power source is connected to one end of the first stopping unit by two steel ropes, and the second power source is connected to one end of the second stopping unit by two steel ropes. The other end of the first stopping unit and the other end of the second stopping unit are respectively connected to a side pinion cage of the joint component by two steel ropes, and the side pinion cage is connected to a middle pinion cage by four steel ropes, thereby driving the joint component to perform two-degree-of-freedom motions.

The present invention provides a robot arm using a power transmission mechanism, which at least comprises a first joint, a second joint, a third joint, a first support arm, a stopping component, and a plurality of steel ropes, and at least comprises a first motor, a second motor, a third motor, a fourth motor, and a fifth motor. The first motor drives the first joint to perform a first degree-of-freedom motion, the second and third motors drive the second joint to perform second and third degree-of-freedom motions, and the fourth and fifth motors drive the third joint to perform fourth and fifth degree-of-freedom motions. The second to fifth motors are all disposed in the first joint and transmit power to the first, second, and third joints through a plurality of steel ropes. The stopping component is disposed in the first support arm, and the fourth and fifth motors transmit power through the stopping component to drive the third joint to perform the fourth and fifth degree-of-freedom motions.

In the power transmission mechanism and the robot arm using the same provided in the present invention, two power sources are transmitted to the joint component through the stopping component, so that the robot arm using steel ropes as a power transmission medium can achieve two-degree-of-freedom motions. Furthermore, the stopping component can efficiently transmit power according to the length of the support arm component without adjusting the tension of the steel ropes or sacrificing the power, and the service life of the robot arm is prolonged. Thus, the present invention provides an optimum design of the power transmission mechanism of the robot arm.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

According to the power transmission mechanism and the robot arm using the same in the present invention, the robot arm is used for simulating actions of the human's arm, and is formed by a structure with a plurality of support arms connected together, and the robot arm is controlled through controlling the pivoting motions of each support arm. The robot arm for simulating the human's arm comprises a waist, a shoulder, an upper arm, an elbow, a fore arm, a wrist, a hand, and fingers. In the following specific embodiments, seven-degree-of-freedom motions are performed for the waist, the shoulder, the upper arm, the elbow, the fore arm, and the wrist. However, the technical features of the present invention are not limited to the following embodiments. Furthermore, each rotation means is mounted by bearings in the robot arm, which can be understood and implemented by those skilled in the art, and the bearings are not described in detail in the following disclosure of the present invention.

Figure 1:
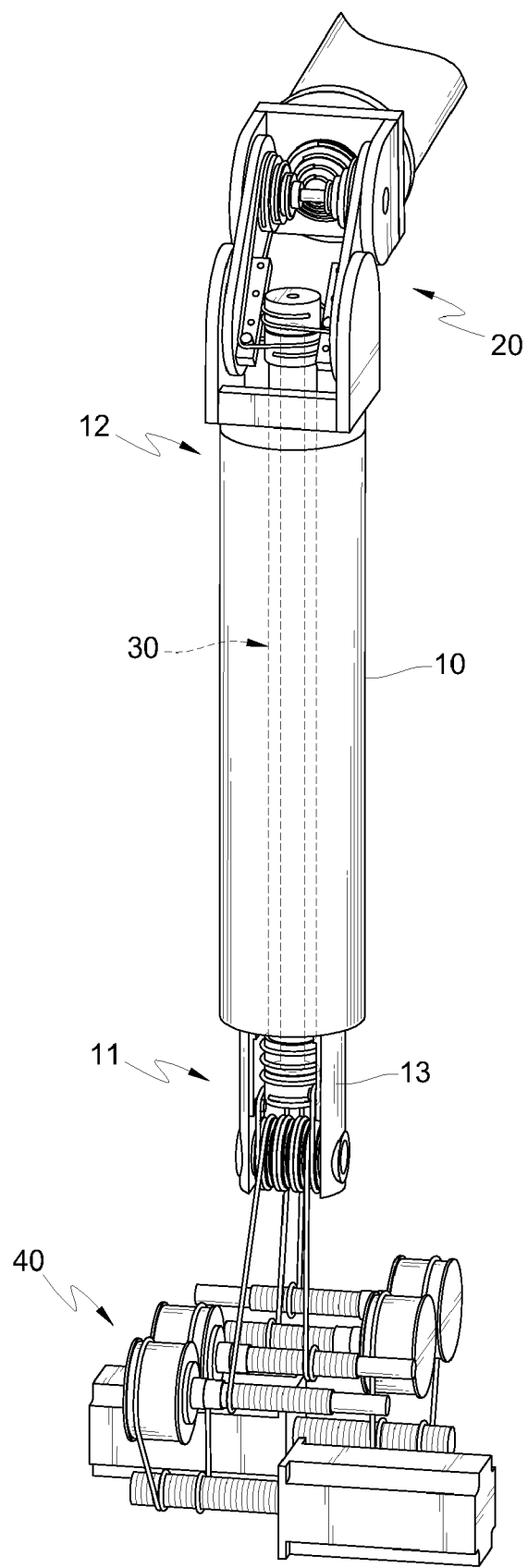
FIG. 1 is a schematic structural view of the present invention.

Referring to FIG. 1, the power transmission mechanism in the present invention mainly comprises a support arm component 10, a joint component 20, a stopping component 30, and a power component 40. The support arm component 10 may be an upper arm of the robot arm. The joint component 20 may be an elbow in the robot arm and mounted at one end of the support arm component 10. The stopping component 30 is mounted in the support arm component 10. The power component 40 is mounted at the other end of the support arm component 10 opposite to the joint component 20 and provides a rotation power, and the rotation power is transmitted to the joint component 20 through the stopping component 30, so as to enable the joint component 20 to perform a two-degree-of-freedom motion.

Figure 2A:
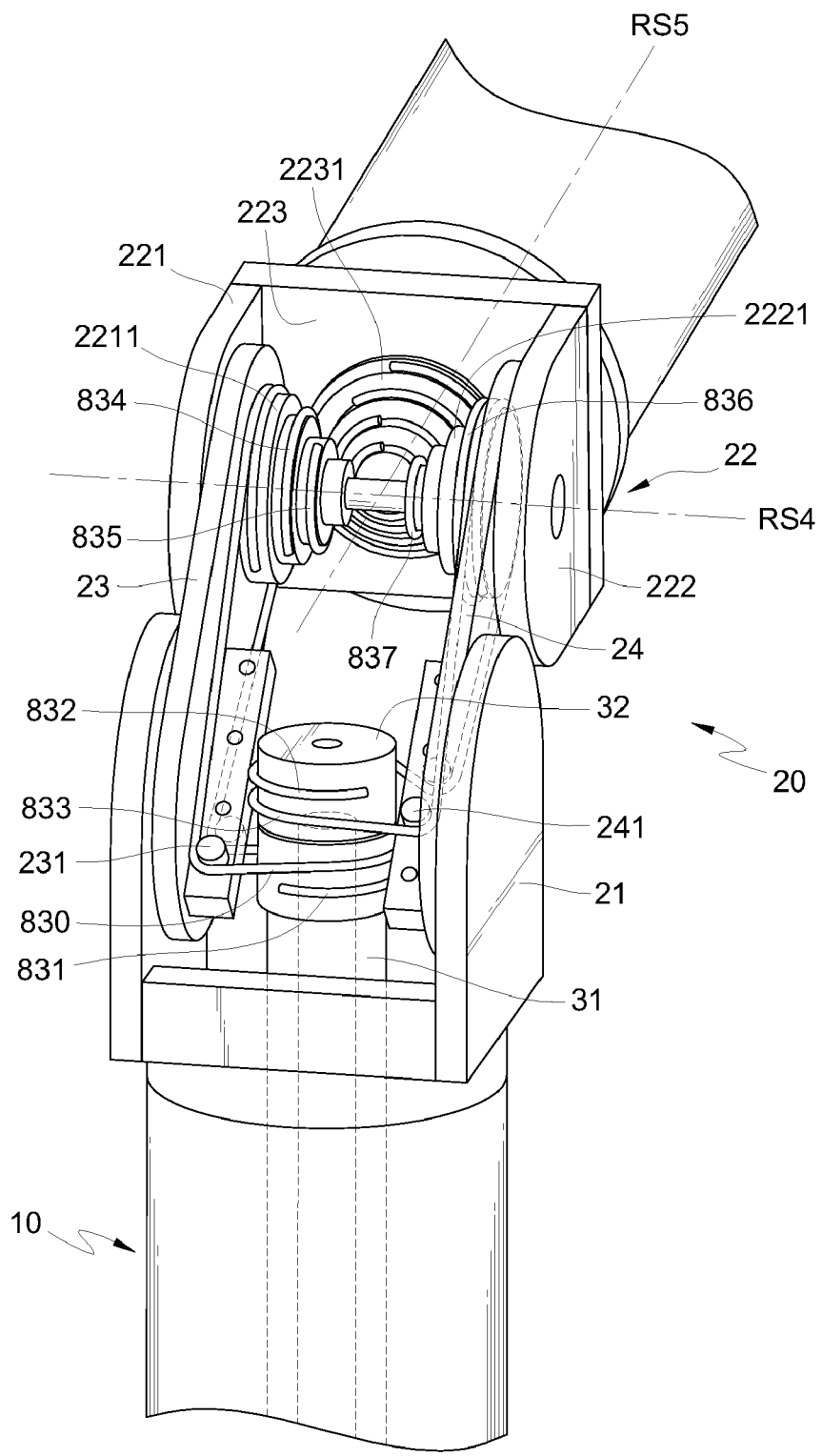
FIG. 2A is a schematic structural view of the present invention.
Figure 2B:
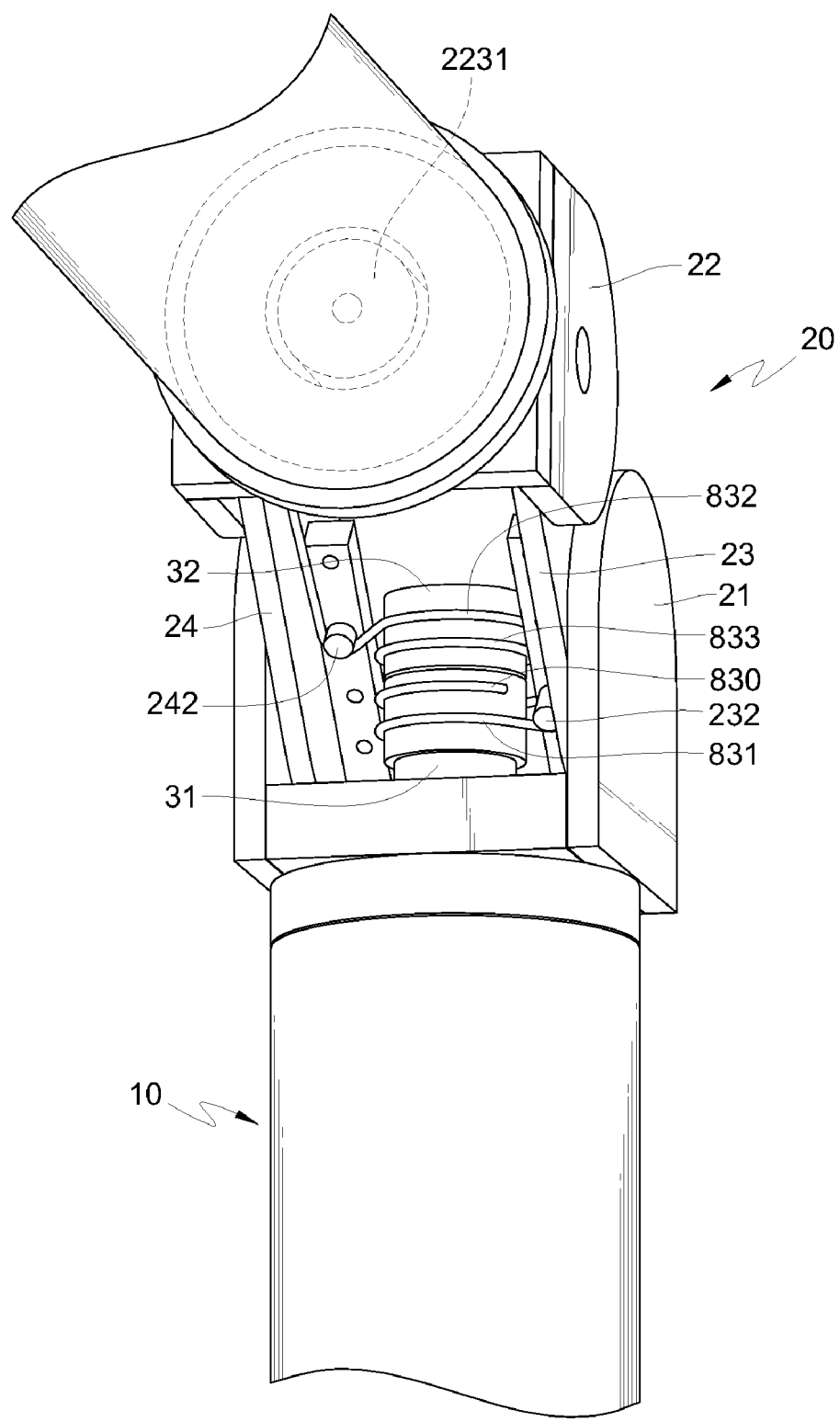
FIG. 2B is a schematic cross-sectional structural view of the present invention.

As shown in FIGS. 2A and 2B, the joint component 20 comprises a first joint seat 21, a second joint seat 22, and two connecting members 23 and 24. The two connecting members 23 and 24 are connected to the first joint seat 21 and the second joint seat 22. The first joint seat 21 is fixed to the two connecting members 23 and 24, and the second joint seat 22 is rotatably pivoted to the two connecting members 23 and 24, so that the second joint seat 22 is rotatable with respect to the first joint seat 21. Steering posts 231, 232, 241, 242 are disposed on the two connecting members 23 and 24 respectively. The first joint seat 21 and the second joint seat 22 are both U-shaped. The second joint seat 22 comprises two side plates 221, 222 and a bottom plate 223. Two side pinion cages 2211 and 2221 are fixed on inner sides of the two side plates 221 and 222, and a middle pinion cage 2231 is rotatably mounted on the bottom plate 223. A rotating axle center RS4 of the side pinion cages 2211 and 2221 is perpendicular to a rotating axle center RS5 of the middle pinion cage 2231, and a two-degree-of-freedom motion is performed through the rotating axle center RS4 and the rotating axle center RS5.

Figure 2C:
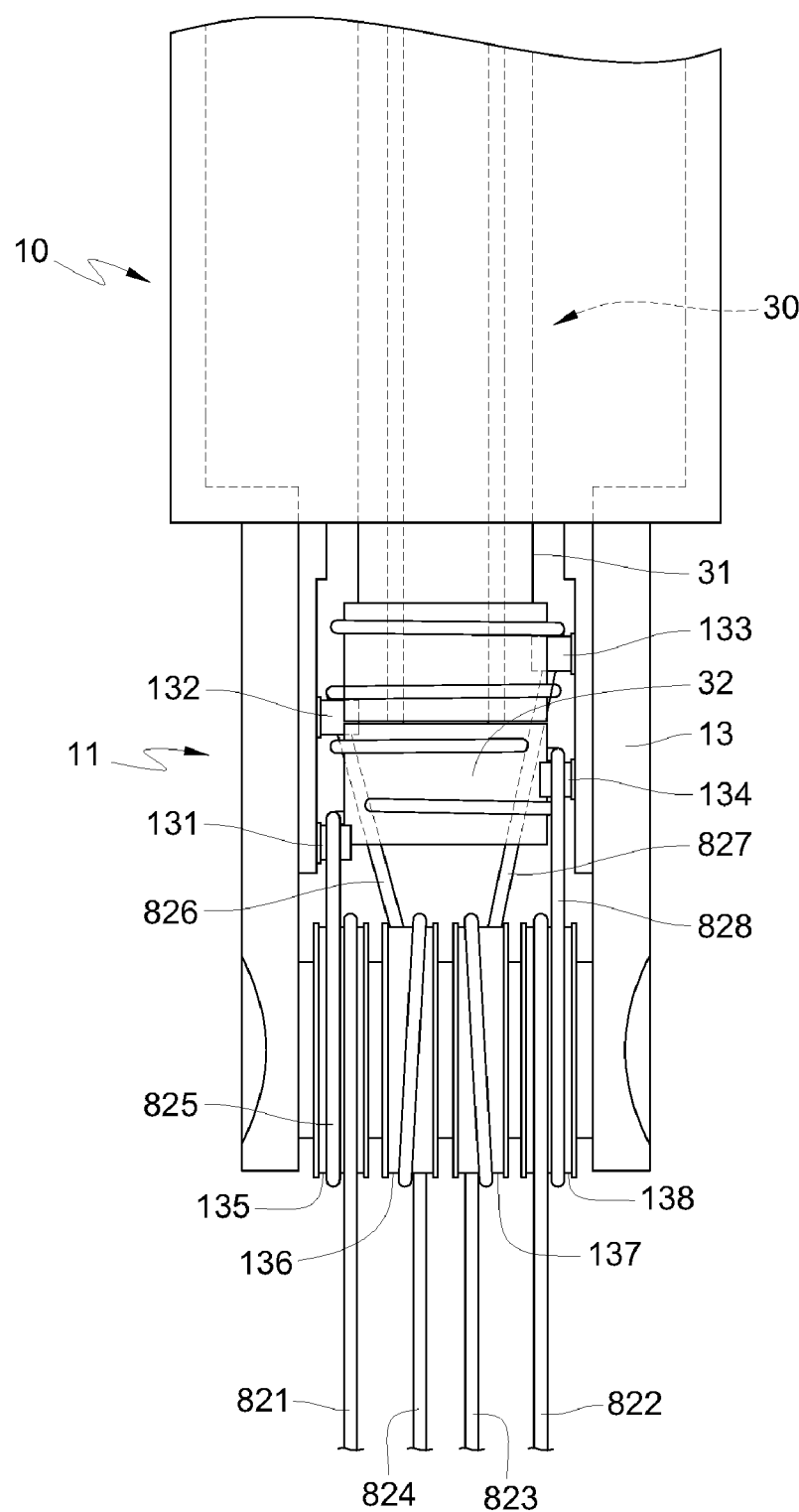
FIG. 2C is a schematic cross-sectional structural view of the present invention.

As shown in FIGS. 1 and 2C, the support arm component 10 is a hollow pipe having two ends, namely, a first end 11 and a second end 12. The joint component 20 is fixed to an opening at the second end 12 of the support arm component 10, and the power component 40 is disposed at the first end 11 of the support arm component 10. A guide wheel stand 13 is disposed at the first end 11, and has four steering posts 131, 132, 133, 134 and four guide wheels 135, 136, 137, 138 disposed thereon.

Figure 2D:
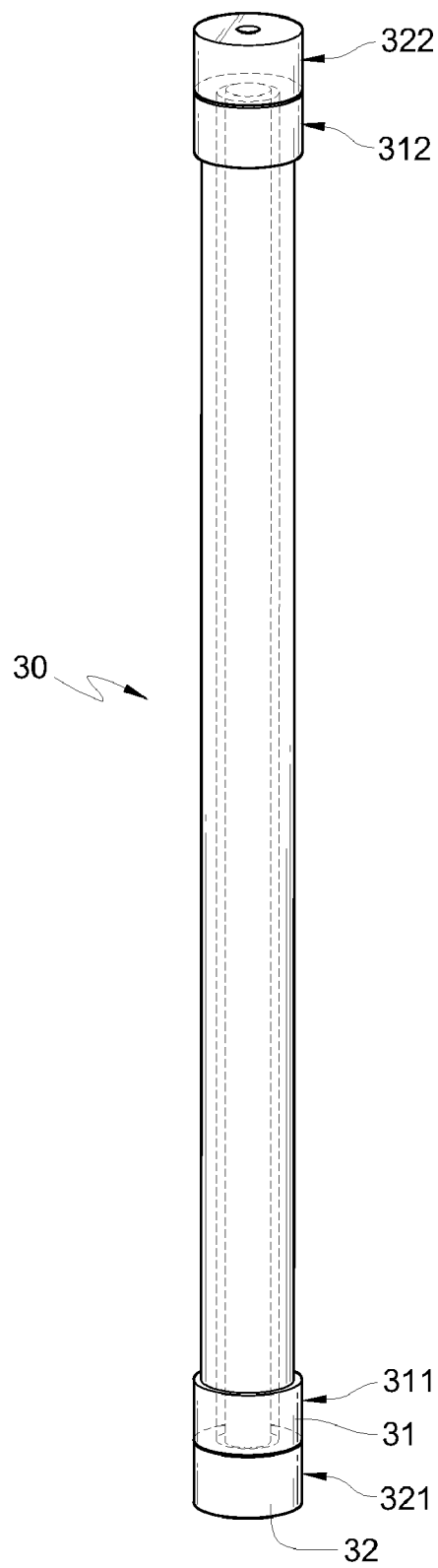
FIG. 2D is a schematic cross-sectional structural view of the present invention.

As shown in FIG. 2D, the stopping component 30 is rotatably mounted in the support arm component 10. The stopping component 30 comprises a first stopping unit 31 and a second stopping unit 32, which are both tube-shaped. Two ends of the first stopping unit 31 and the second stopping unit 32 are first ends 311, 321 and second ends 312, 322 respectively, and the first stopping unit 31 may be inserted into the second stopping unit 32 in a coaxial rotation relation.

Figure 2E:
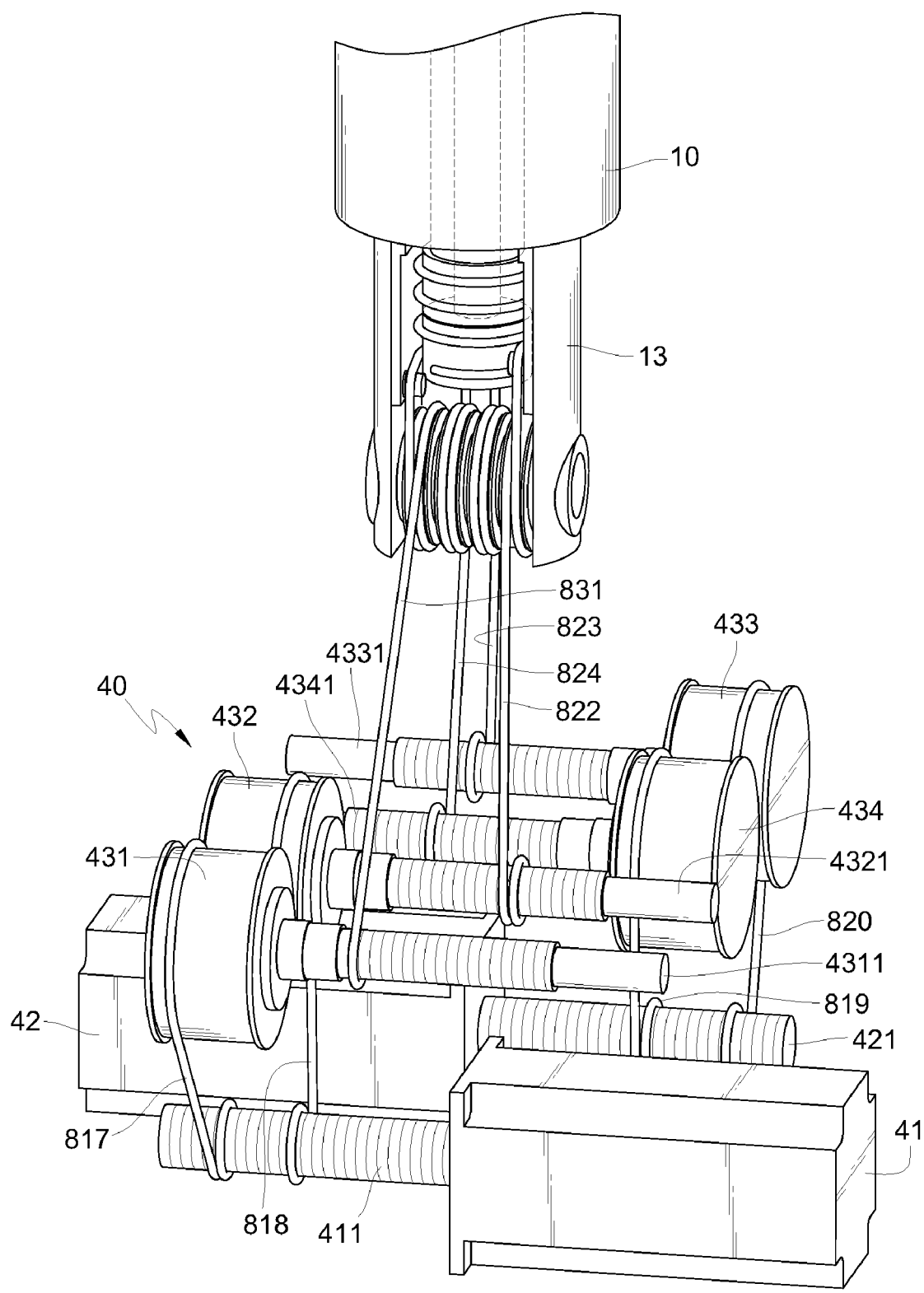
FIG. 2E is a schematic cross-sectional structural view of the present invention.

As shown in FIG. 2E, the power component 40 comprises a first power source 41, a second power source 42, and four speed reducers 431, 432, 433, 434. The first power source 41 and the second power source 42 are motors, which can perform reciprocating rotation in clockwise and counterclockwise directions. The first power source 41 and the second power source 42 have output shafts 411, 421 respectively. The speed reducers 431, 432, 433, 434 have output shafts 4311, 4321, 4331, 4341 respectively.

Referring to FIGS. 1, 2A, 2B, 2C, 2D, and 2E, two steel ropes 817, 818 are connected to the output shaft 411 of the first power source 41 and fixed to the output shafts 4311, 4321 of the speed reducers 431, 432. Two steel ropes 819, 820 are connected to the output shaft 421 of the second power source 42 and fixed to the output shafts 4331, 4341 of the speed reducers 433, 434. Four steel ropes 821, 822, 823, 824 are respectively connected to the output shafts 4311, 4321, 4331, 4341 of the speed reducers 431, 432, 433, 434 and fixed to the guide wheels 135, 136, 137, 138. Two steel ropes 825, 828 are connected to the guide wheels 135, 138 and fixed to the first end 321 of the second stopping unit 32 via the steering posts 131, 134. Two steel ropes 826, 827 are connected to the guide wheels 136, 137 and fixed to the first end 311 of the first stopping unit 31 via the steering posts 132, 133.

Two steel ropes 830, 831 are connected to the second end 312 of the first stopping unit 31 and fixed to the side pinion cage 2211 via the steering posts 231, 232. Two steel ropes 832, 833 are connected to the second end 322 of the second stopping unit 32 and fixed to the side pinion cage 2221 through the steering posts 233, 234. Four steel ropes 834, 835, 836, 837 are respectively connected to the side pinion cages 2211, 2221 and fixed to the middle pinion cage 2231.

Figure 3A:
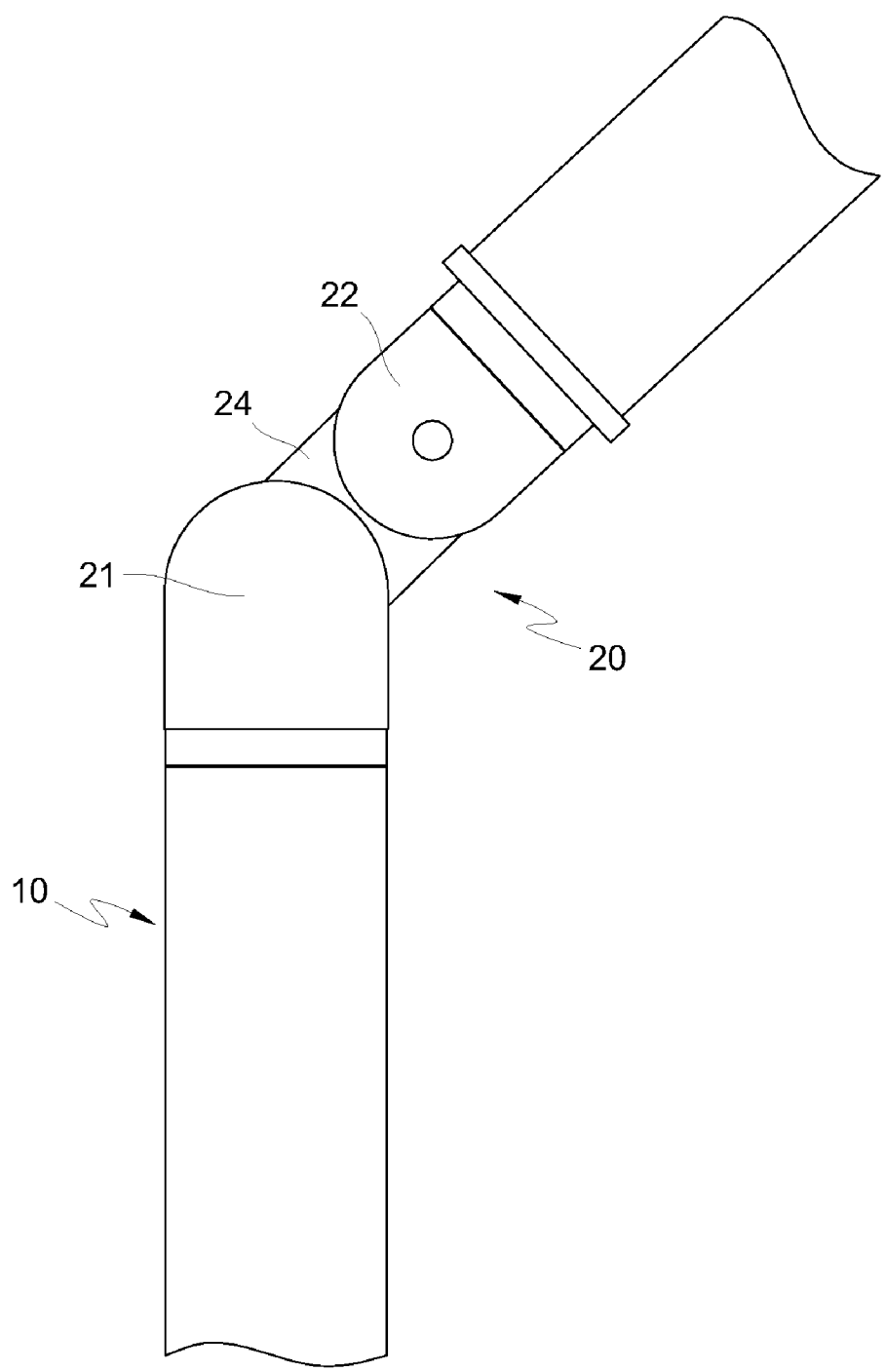
FIGS. 3A, 3B, and 3C are schematic views of an application of the present invention.
Figure 3B:
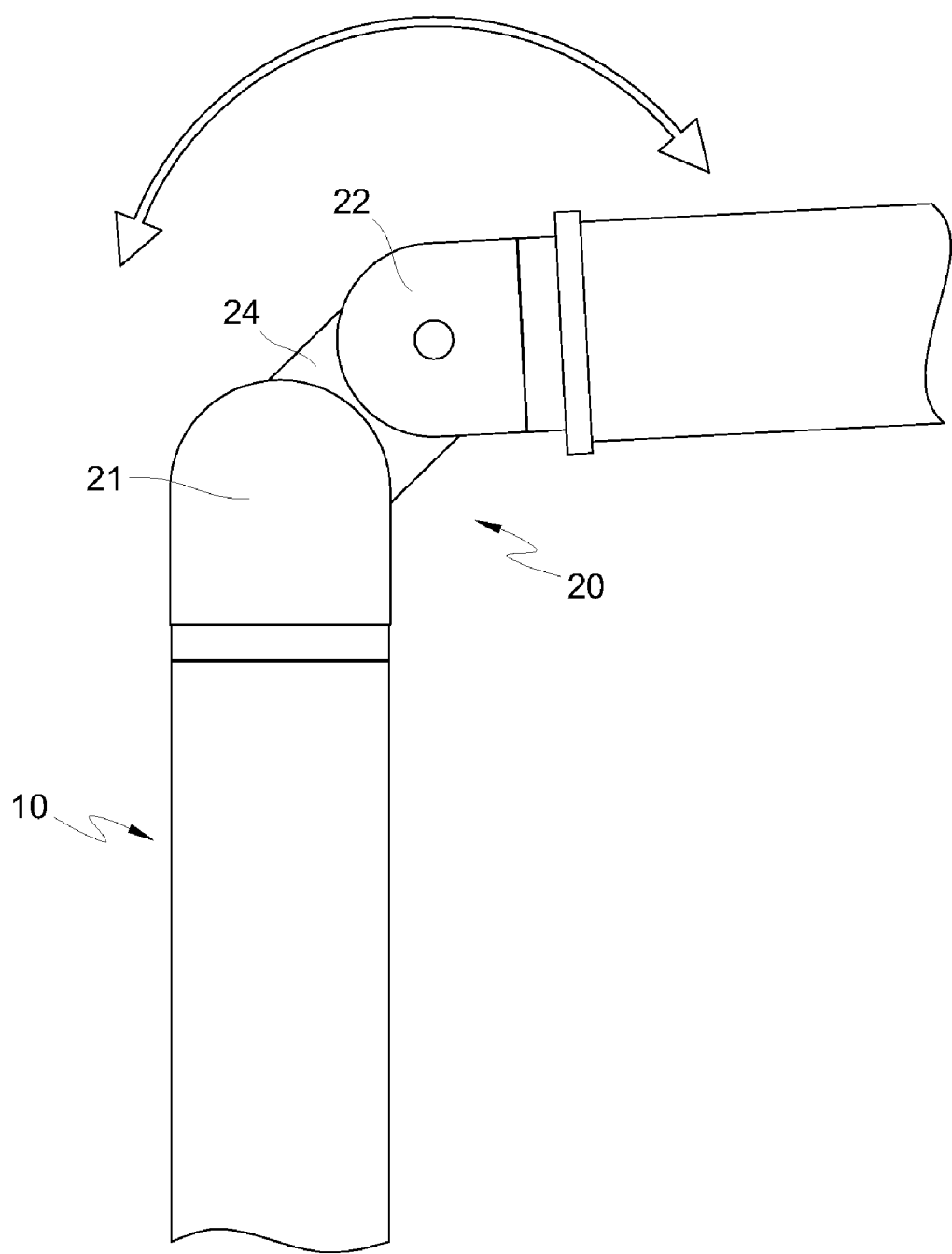
Figure 3C:
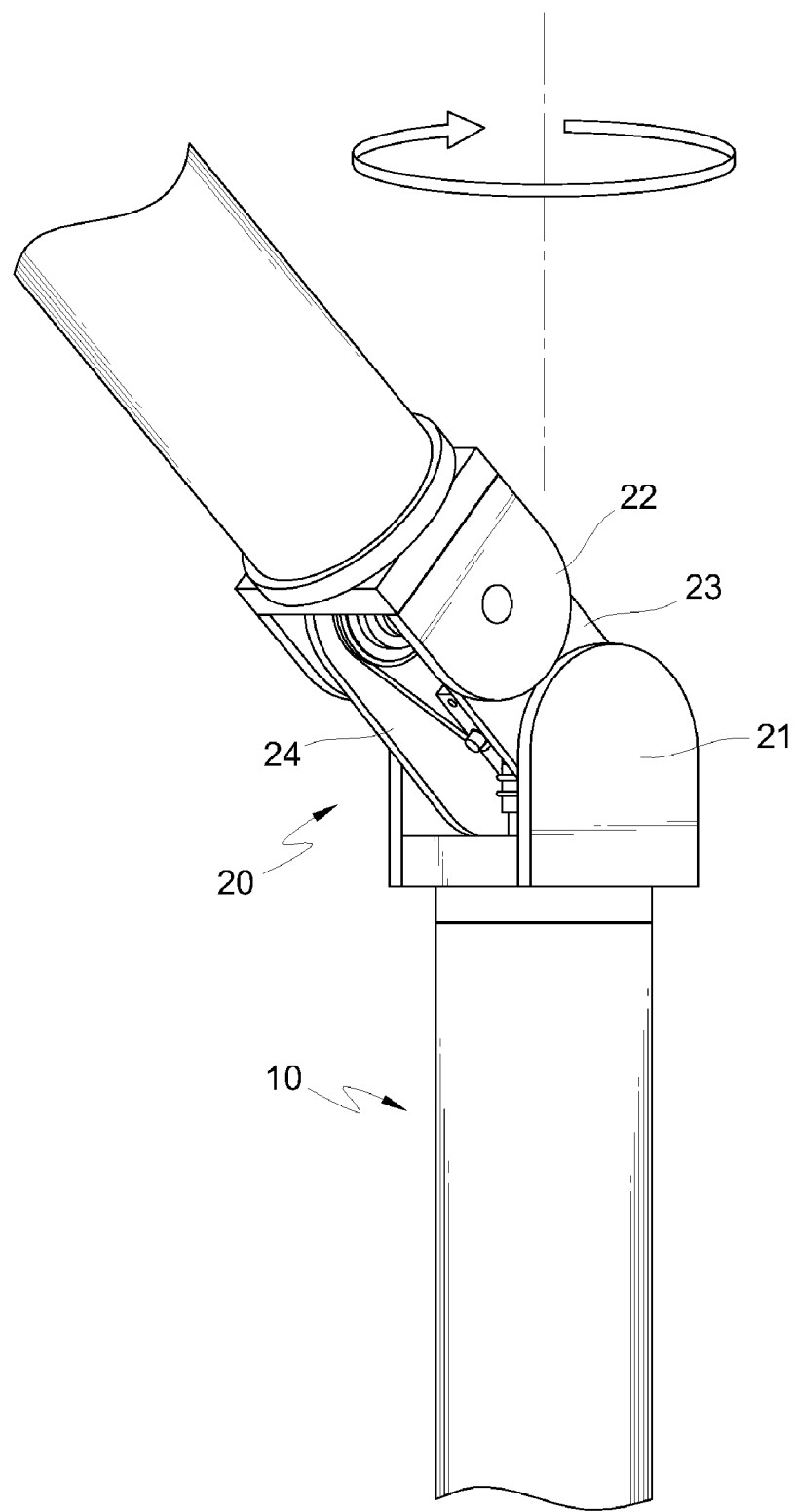
Figure 4A:
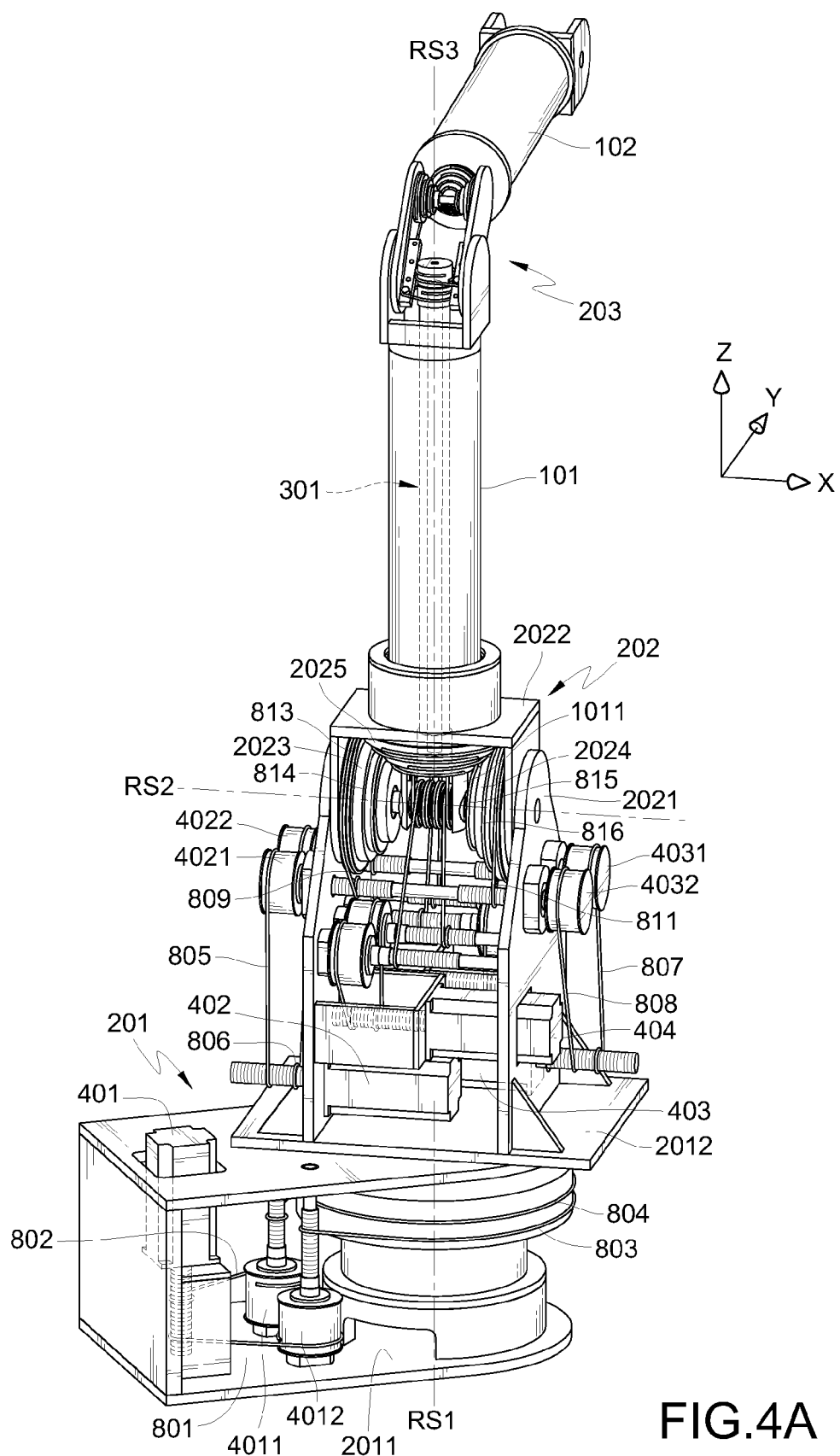
FIGS. 4A-4D are schematic views of a robot arm of the present invention.
Figure 4B:
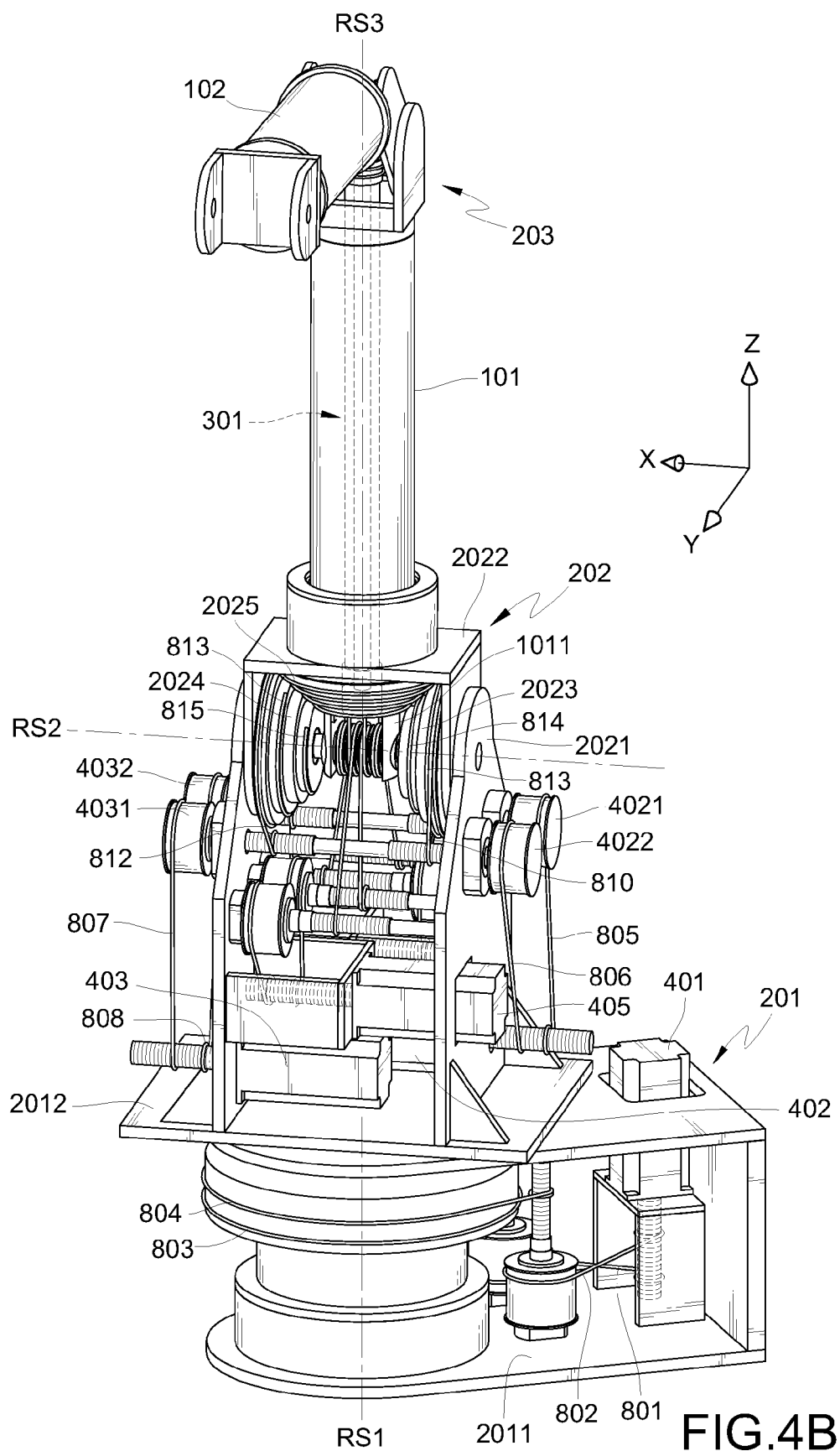
Figure 4C:
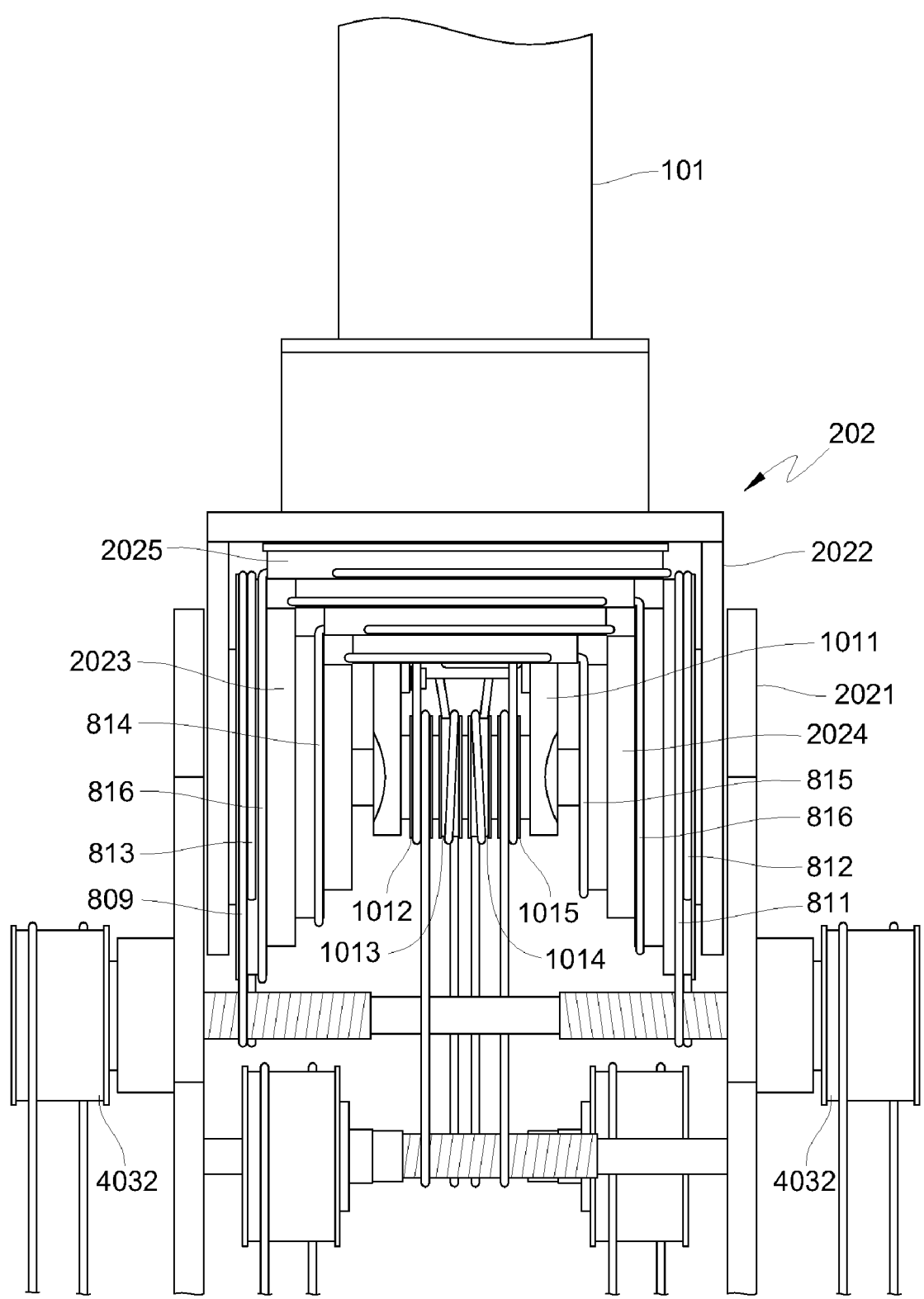
Figure 4D:
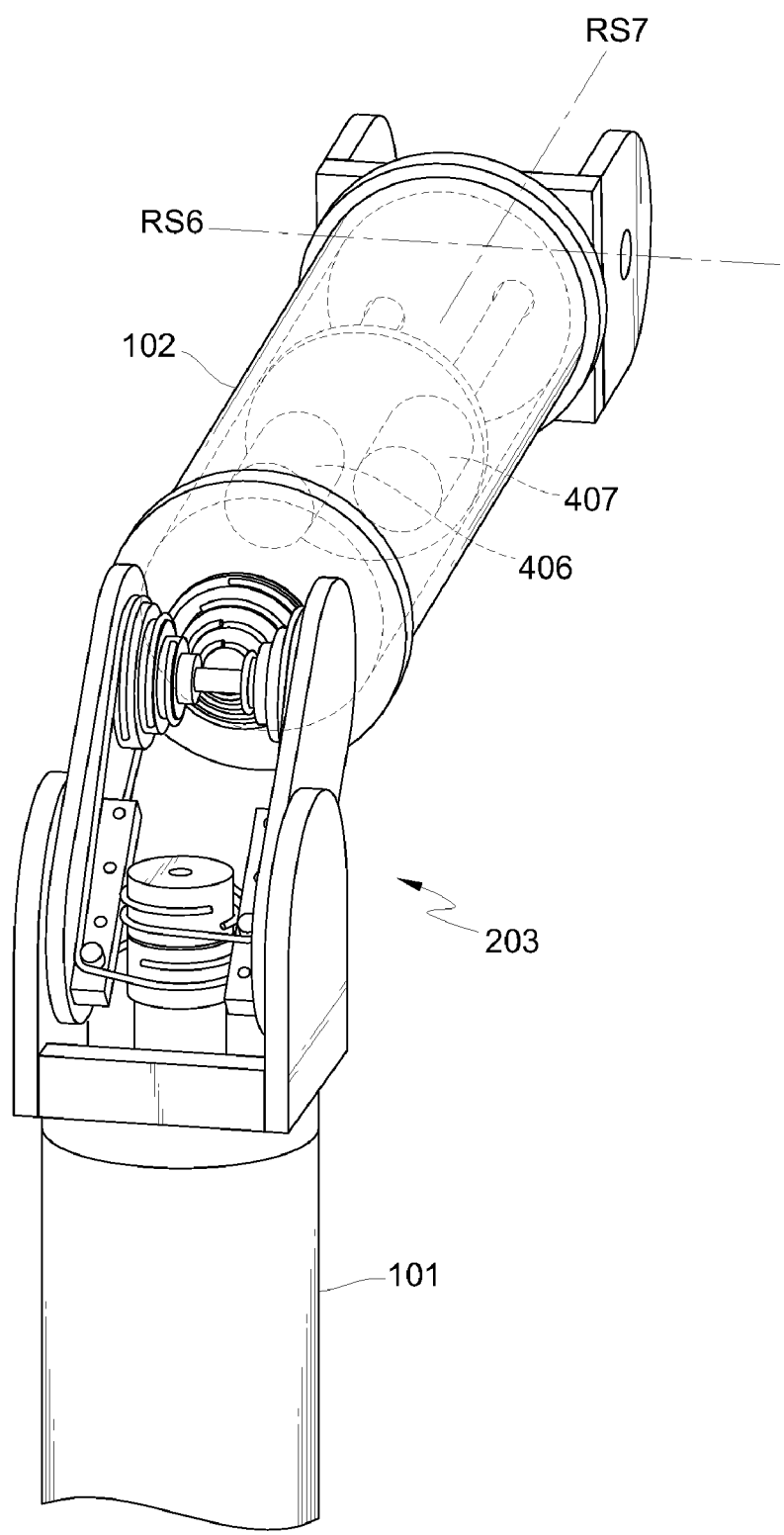

Referring to FIGS. 3A, 3B, and 3C, in the power transmission mechanism according to the present invention, the first power source 41 and the second power source 42 output a clockwise or counterclockwise rotation power and drive the speed reducers 431, 432, 433, 434 to rotate through the steel ropes 817, 818, 819, 820. The speed reducers 431, 432, 433, 434 drive the first stopping unit 31 and the second stopping unit 32 to rotate via the steel ropes 821, 822, 823, 824, the guide wheels 135, 136, 137, 138, and the steel ropes 825, 826, 827, 828. The first stopping unit 31 and the second stopping unit 32 drive the side pinion cages 2211, 2221 to rotate via the steel ropes 830, 831, 832, 833. The side pinion cages 2211, 2221 drive the middle pinion cage 2231 to rotate via the steel ropes 834, 835, 836, 837. When the first power source 41 and the second power source 42 rotate in the same direction, for example, in a clockwise or counterclockwise direction, the second joint 22 is driven to rotate about the rotating axle center RS4 to swing up and down. When the first power source 41 and the second power source 42 rotate in opposite directions (i.e., the first power source 41 rotates in a clockwise direction whereas the second power source 42 rotates in a counterclockwise direction, or the first power source 41 rotates in a counterclockwise direction whereas the second power source 42 rotates in a clockwise direction), the middle pinion cage 2231 rotates about the rotating axle center RS5 in a clockwise or counterclockwise direction, so as to enable the joint component 20 to perform a two-degree-of-freedom motion about the rotating axle center RS4 and the rotating axle center RS5.

According to the power transmission mechanism in the present invention, the first stopping unit 31 and the second stopping unit 32 of the stopping component 30 are used for transmitting power between the power component 40 and the joint component 20, and the stopping component 30 can transmit the power according to the length of the support arm component 10, thereby effectively solving the power loss problem or the winding problem of steel ropes when the power is transmitted for a long distance directly via the steel ropes. Furthermore, the four steel ropes 830, 831, 832, 833 can be connected to the first stopping unit 31 and the second stopping unit 32 of the stopping component 30 and the two side pinion cages 2211, 2221, thereby effectively solving the problem that only one degree-of-freedom can be provided when the power is transmitted for a long distance directly via the steel ropes.

Referring to FIGS. 4A-4D, the robot arm using a power transmission mechanism in the present invention at least comprises a first joint 201, a second joint 202, a third joint 203, a first support arm 101, a second support arm 102, and a stopping component 301, and at least comprises a first motor 401, a second motor 402, a third motor 403, a fourth motor 404, a fifth motor 405, a sixth motor 406, and a seventh motor 407. The first motor 401 drives the first joint 201 to perform a first degree-of-freedom motion. The second and third motors 402, 403 drive the second joint 202 to perform second and third degree-of-freedom motions. The fourth and fifth motors 404, 405 drive the third joint 203 to perform fourth and fifth degree-of-freedom motions. The sixth and seventh motors 406, 407 provide sixth and seventh degree-of-freedom motions. The first joint 201 correspondingly simulates actions of a waist, the second joint 202 correspondingly simulates actions of a shoulder, the first support arm 101 correspondingly simulates actions of an upper arm, the third joint 203 correspondingly simulates actions of an elbow, the second support arm 102 correspondingly simulates actions of a fore arm, and the sixth and seventh motors 406, 407 provide a power for simulating actions of a wrist.

According to the robot arm in the present invention, the first joint 201 comprises a base 2011 and a supporting plate 2012. The supporting plate 2012 is rotatably disposed on the base 2011. The first motor 401 is disposed in the base 2011 and connected to two speed reducers 4011, 4012 through the steel ropes 801, 802. Then, the two speed reducers 4011, 4012 are connected to the supporting plate 2012 through the steel ropes 803, 804, so as to enable the supporting plate 2012 to perform the first degree-of-freedom motion about a rotating axle center RS1.

The second joint 202 comprises a first joint seat 2021 and a second joint seat 2022. The first joint seat 2021 is fixed on the supporting plate 2012, and the second joint seat 2022 is rotatably disposed on the first joint seat 2021 and rotates about a rotating axle center RS2. The second motor 402, the third motor 403, the fourth motor 404, and the fifth motor 405 are disposed in the first joint seat 2021. The second joint seat 2022 comprises two side pinion cages 2023, 2024 and a middle pinion cage 2025 (Please refer to the disclosure about the joint component 20 of the power transmission mechanism in the present invention for the specific structures, constitutions, and relations in this part). The first support arm 101 is rotatably disposed on the second joint seat 2022, and driven by the middle pinion cage 2025 to rotate about a rotating axle center RS3. A guide wheel stand 1011 is disposed on the first support arm 101, and guide wheels 1012, 1013, 1014, and 1015 are disposed on the guide wheel stand 1011 (Please refer to the disclosure about the support arm component 10 of the power transmission mechanism in the present invention for the specific structures, constitutions, and relations in this part).

The second motor 402 and the third motor 403 are connected to their respective two speed reducers among the speed reducers 4021, 4022, 4031, 4032 via the steel ropes 805, 806, 807, 808. Then, the speed reducers 4021, 4022, 4031, 4032 are connected to the two side pinion cages 2023, 2024 via the steel ropes 809, 810, 811, 812. The two side pinion cages 2023, 2024 are connected to the middle pinion cage 2025 via the steel ropes 813, 814, 815, 816. When the second motor 402 and the third motor 403 rotate in the same direction, for example, in a clockwise or counterclockwise direction, the second joint seat 2022 is driven to rotate about the rotating axle center RS2 to swing up and down, so as to perform the second degree-of-freedom motion. When the second motor 402 and the third motor 403 rotate in opposite directions, the middle pinion cage 2025 rotate in a clockwise or counterclockwise direction about the rotating axle center RS3, and drives the first support arm 101 to rotate, so as to perform a third degree-of-freedom motion.

According to the robot arm in the present invention, the fourth motor 404 and the fifth motor 405 correspond to the first power source 41 and the second power source 42 of the power transmission mechanism, the first support arm 101 corresponds to the support arm component 10, the stopping component 301 corresponds to the stopping component 30, and the third joint 203 corresponds to the joint component 20. Thus, the specific structures, constitutions, and motion relations will not be repeated here. The fourth degree-of-freedom motion and the fifth degree-of-freedom motion about a rotating axle center RS4 and a rotating axle center RS5 are provided by the third joint 203.

The second support arm 102 is rotatably disposed at the third joint 203. The sixth motor 406 and the seventh motor 407 are disposed in the second support arm 102, and used to provide the power for simulating the actions of the wrist in terms of a sixth degree-of-freedom motion (a rotating axle center RS6) and a seventh degree-of-freedom motion (a rotating axle center RS7).

According to the robot arm in the present invention, the stopping component 301 is used for transmitting power between the fourth motor 404 and the fifth motor 405 and the third joint 203, so that the fourth motor 404 and the fifth motor 405 can be disposed at the second joint 202, thereby effectively solving the problems about the complicated structure and large rotation inertia when the fourth motor 404 or the fifth motor 405 is directly mounted at the third joint 203. The stopping component 301 can transmit the power according to the length of the first support arm 101, so as to effectively solve the power loss problem or the winding problem of steel ropes when the power is transmitted for a long distance directly via the steel ropes, thereby providing a robot arm having seven degree-of-freedom motions.

What is claimed is:

1. A robot arm, comprising: a first joint, a second joint connected to the first joint, a first support arm connected to the second joint, a third joint connected to the first support arm, a second support arm connected to the third joint, a stopping component mounted in the first support arm, a first motor disposed at the first joint and used for driving the first joint to perform a first degree-of-freedom motion, a second motor and a third motor disposed at the second joint and used for driving the second joint to perform a second degree-of-freedom motion and a third degree-of-freedom motion, a fourth motor and a fifth motor disposed at the third joint and used for driving the third joint to perform a fourth degree-of-freedom motion and a fifth degree-of-freedom motion, and a sixth motor and a seventh motor disposed in the second support arm and providing power for a sixth degree-of-freedom motion and a seventh degree-of-freedom motion;

wherein the stopping component comprises a first stopping unit and a second stopping unit that rotate coaxially, the fourth motor drives the first stopping unit to perform reciprocating rotation, the fifth motor drives the second stopping unit to perform reciprocating rotation, the first stopping unit and the second stopping unit drive the third joint to perform the fourth degree-of-freedom motion and the fifth degree-of-freedom motion.

2. The robot arm according to claim 1, further comprising: a plurality of steel ropes, wherein the first to seventh motors, the first and second joints, and the stopping component are connected through the plurality of steel ropes, so as to transmit power.

3. The robot arm according to claim 1, wherein the fourth motor is connected to a pair of speed reducers, and the pair of speed reducers is connected to and drives the first stopping unit.

4. The robot arm according to claim 1, wherein the fifth motor is connected to a pair of speed reducers, and the pair of speed reducers is connected to and drives the second stopping unit.

* * * * *